March 7, 1961 H. B. MURRAY ET AL 2,973,906
HOSE REELING APPARATUS
Filed March 10, 1959 7 Sheets-Sheet 1

INVENTORS.
Hilton B. Murray &
Henry K. Flinchbaugh,
BY Paul & Paul
ATTORNEYS.

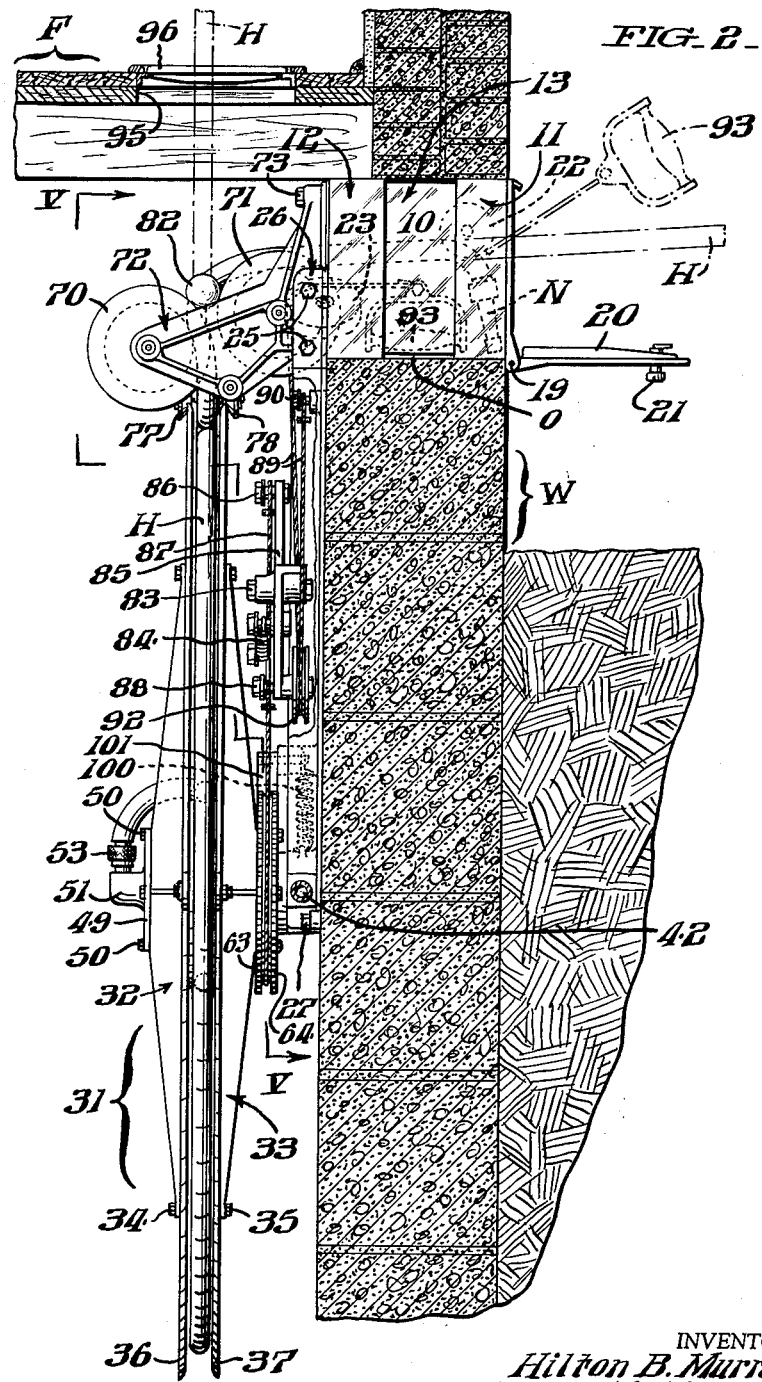

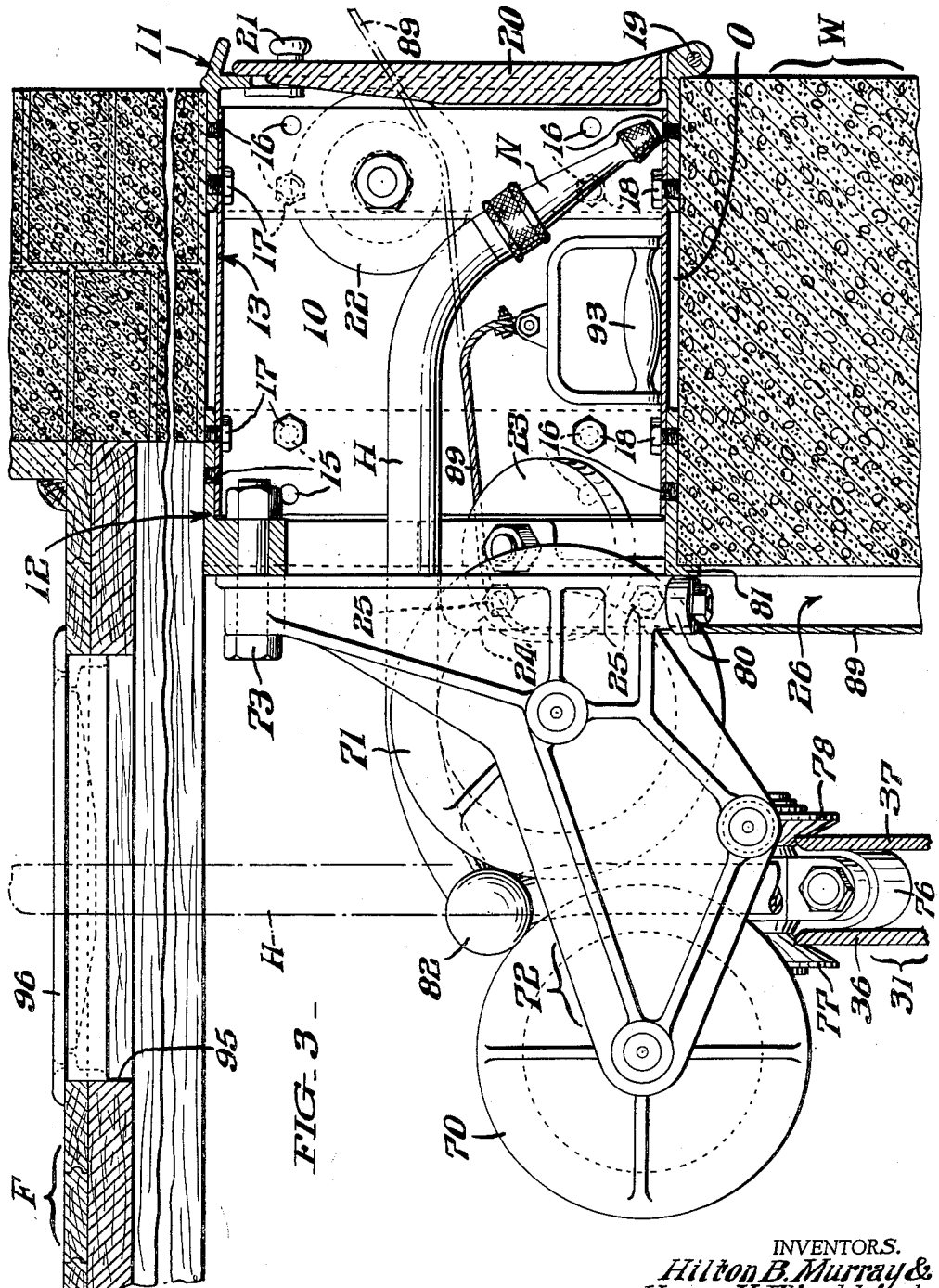

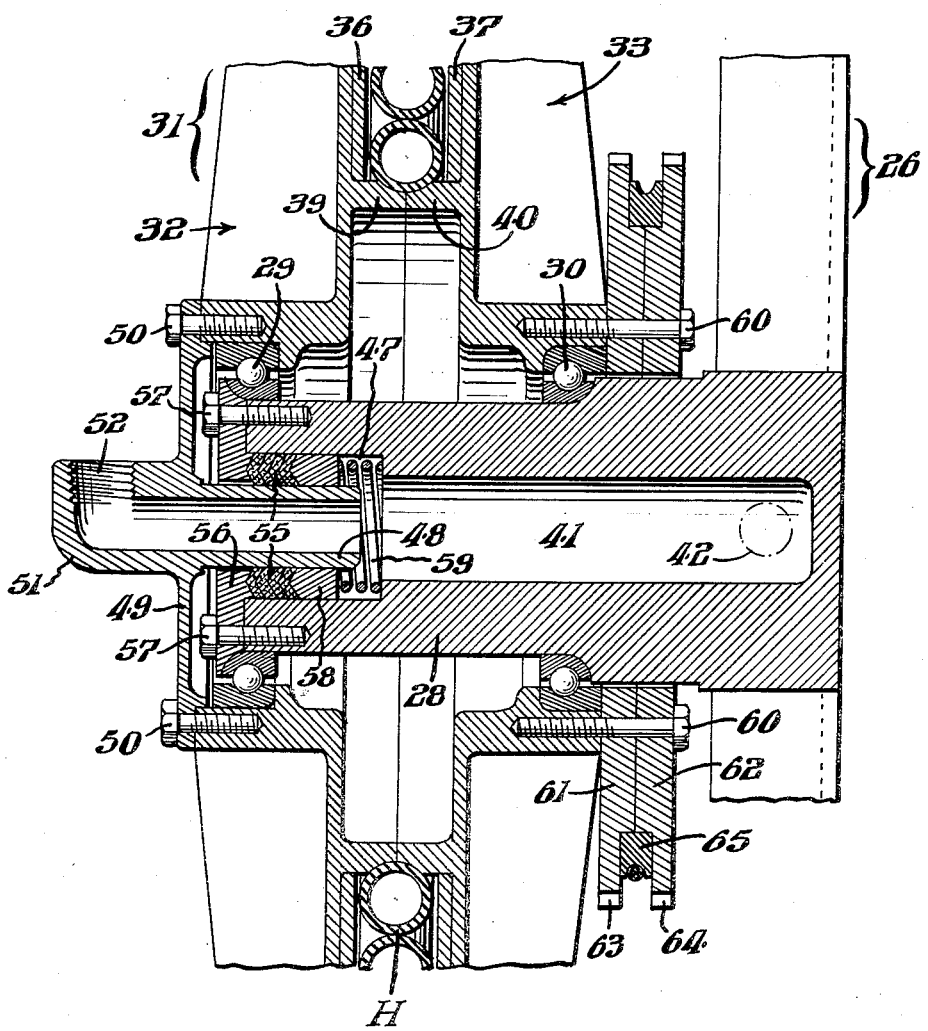

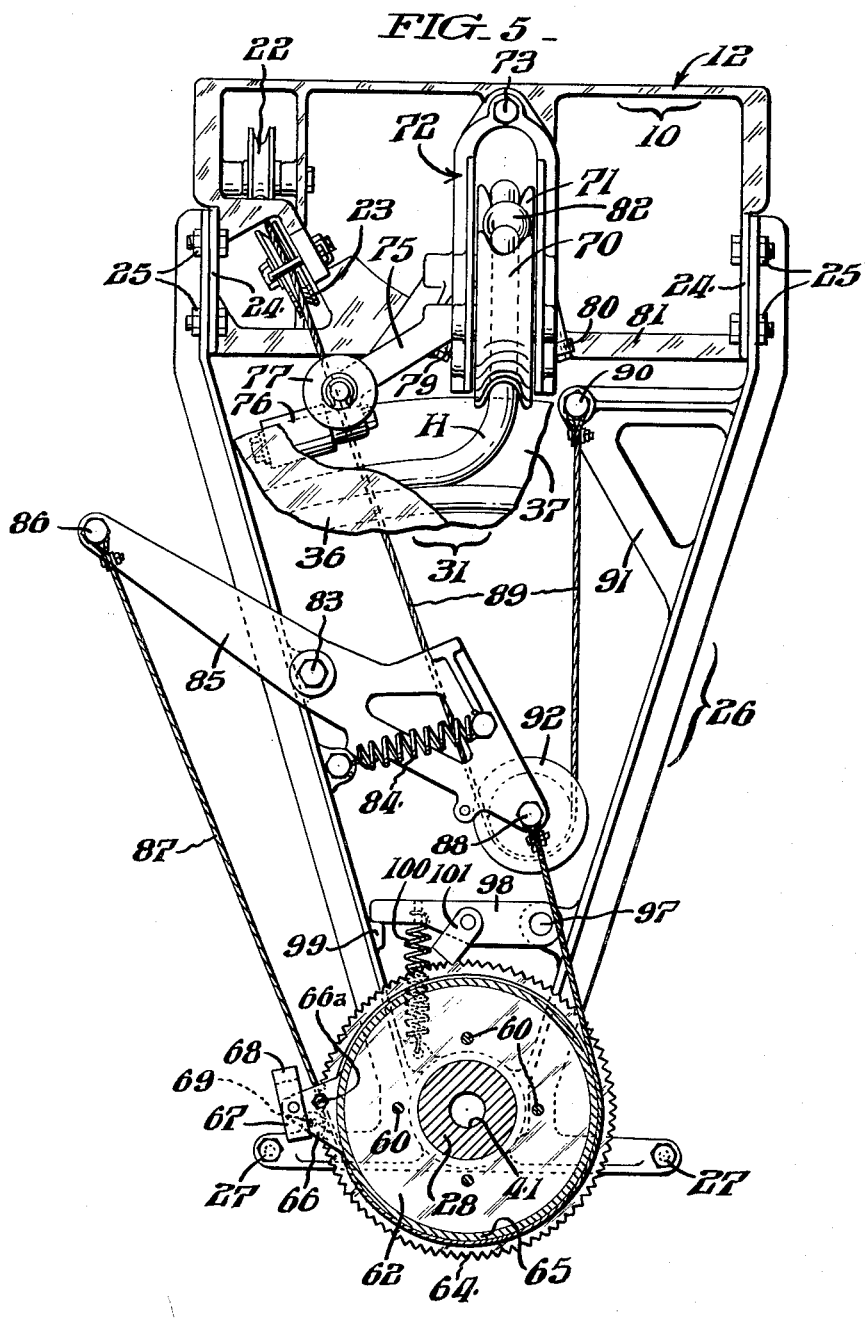

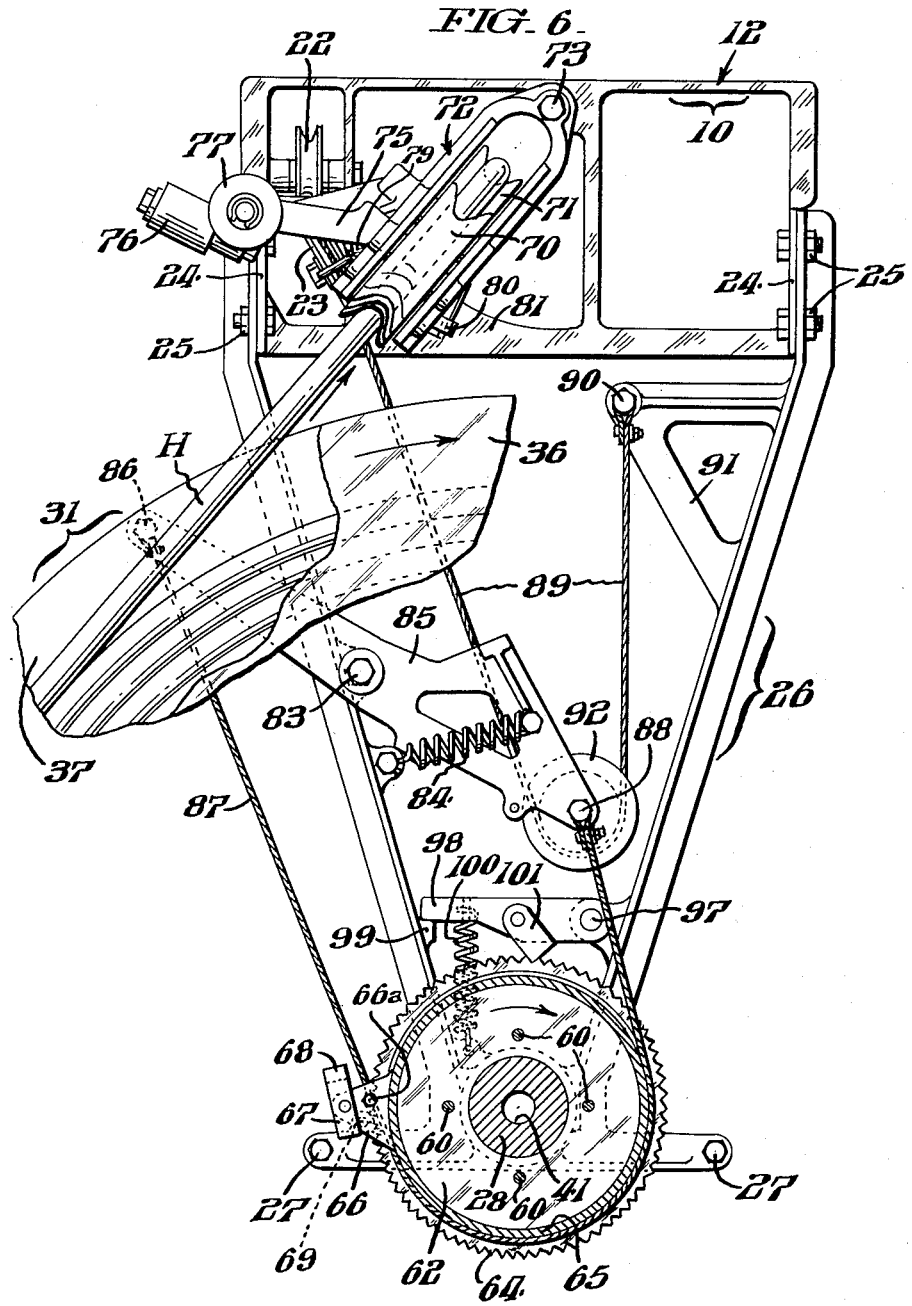

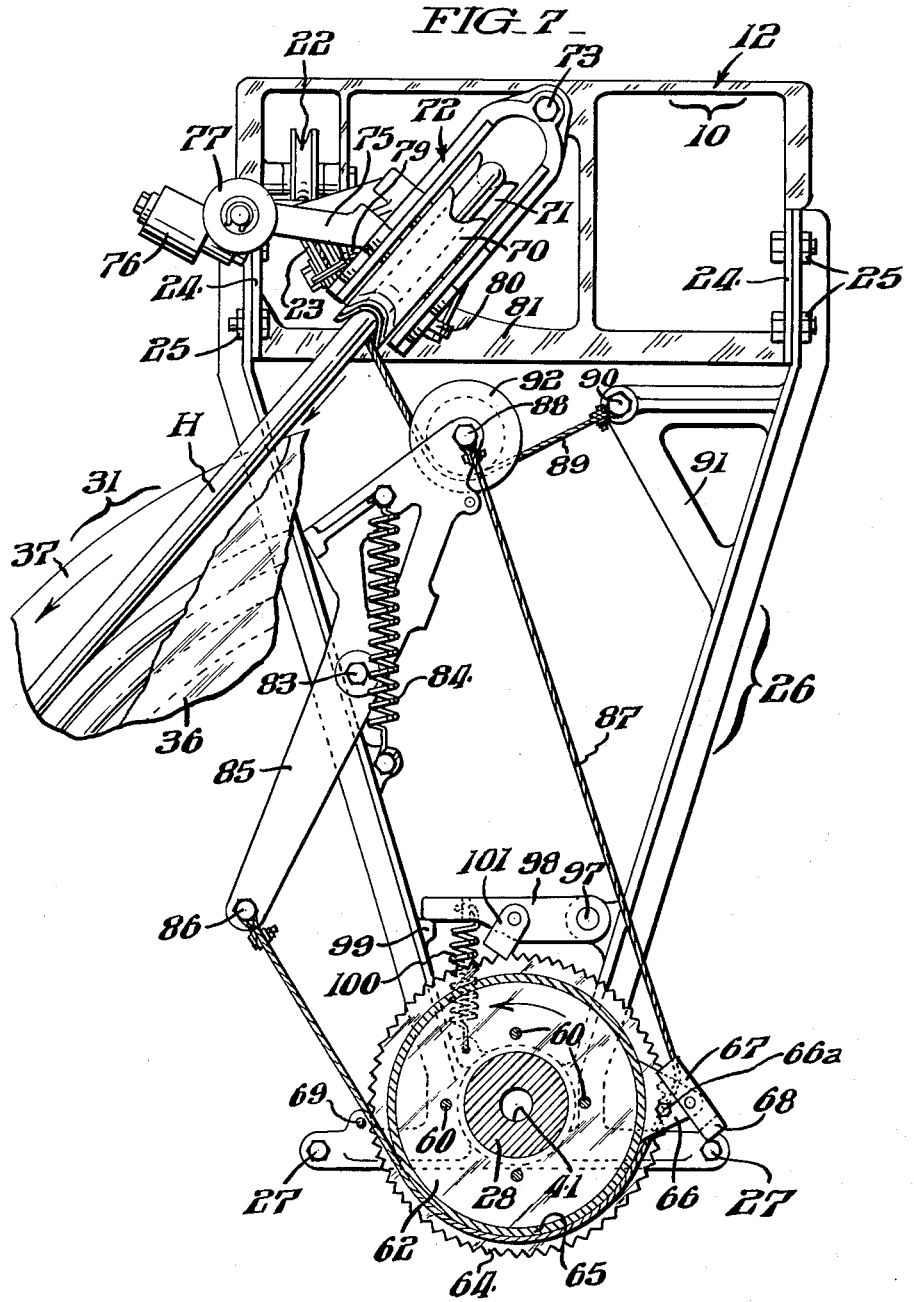

United States Patent Office 2,973,906
Patented Mar. 7, 1961

2,973,906

HOSE REELING APPARATUS

Hilton B. Murray, R.D. 9, and Henry K. Flinchbaugh, 930 Arlington Road, both of York, Pa.

Filed Mar. 10, 1959, Ser. No. 798,518

9 Claims. (Cl. 239—197)

This invention relates to hose reeling apparatus. More specifically, it is concerned with reel apparatus for water hose intended for use in dwellings, and the like.

One of the aims of our invention is to provide a hose reeling apparatus for the above use which is simple in construction; which is sturdy against easy derangement; in which the reel is so mounted as to offer negligible resistance to ready withdrawal of the hose manually; and in which the reel is manually operable to retrieve the hose with exertion of minimum effort.

Another object of our invention is to provide a water hose reeling apparatus having the above attributes adapted to be installed, for example, in the basement of a dwelling; and which is so disposed and arranged as to render the hose accessible for easy withdrawal from out-of-doors for gardening purposes, or from within the building for use in fire emergencies.

Other objects and attendant advantages will appear from the following detailed description of the attached drawings, wherein:

Fig. 2 is a fragmentary view in section taken as indicated by the angled arrows II—II in Fig. 1.

Figs. 3 and 4 are fragmentary views in vertical section taken respectively as indicated by the angled arrows III—III and IV—IV in Fig. 1.

Fig. 5 is a broken out view partly in elevation and partly in section taken as indicated by the angled arrows V—V in Fig. 2 with the movable parts of the apparatus all in their normal rest positions and the hose fully wound upon the reel.

Fig. 6 is a view corresponding to Fig. 5 showing the positional relationship of the various moving parts during withdrawal of the hose from the reel; and Fig. 7 is likewise a view similar to Fig. 5 showing the positional relationship of the moving parts during rewinding or retrieving of the hose upon the reel after use.

Figure 1:
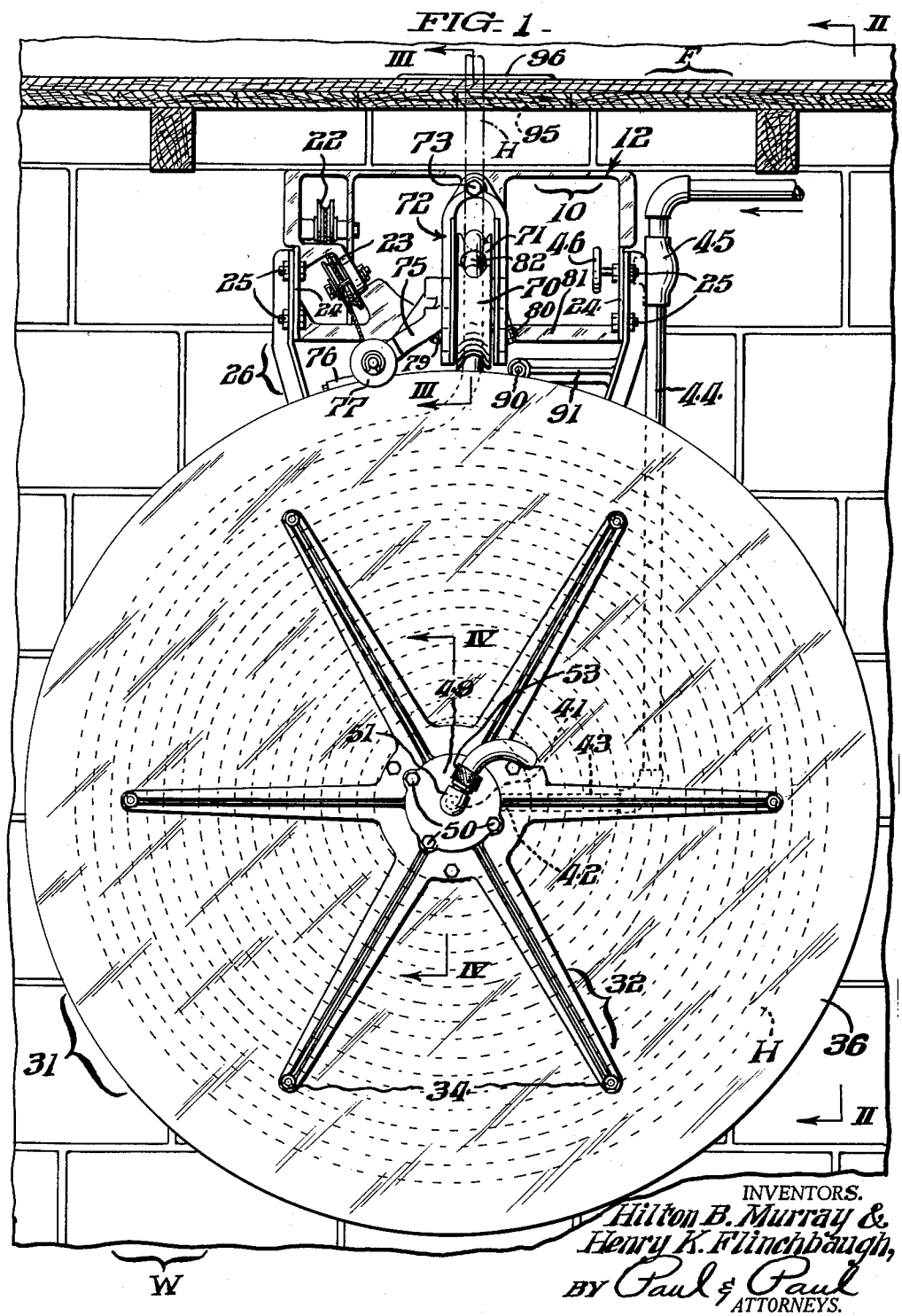
Fig. 1 is a fragmentary view in vertical section of a dwelling or other building equipped with a hose reeling apparatus conveniently embodying our invention.

As herein exemplified, the apparatus of our invention comprises a small rectangular tri-part access box 10 which, as shown in Figs. 2 and 3, is snugly set into a correspondingly configured opening O provided in a foundation wall W of a building immediately beneath the ground floor F. The outer and inner components 11 and 12 of the access box 10 are in the form of cast rectangular frames, while the intermediate component 13 is fashioned from stout sheet material and telescoped into said outer and inner components. From Fig. 3 it will be noted that the intermediate component 13 of the access box 10 is provided in its opposite sides adjacent opposite ends thereof with laterally spaced holes 15 and 16 for selective passage therethrough of the shanks of headed screw bolts 17 and 18 that thread into the corresponding side bars of the end components 11 and 12 respectively. As a consequence, the access box 10 can be adjusted for installation into walls of different thicknesses. When the wall W is constructed of concrete blocks as herein conventionally shown, the opening O is provided by omission of one or more of the blocks, and the access box adjusted to suit the width of said blocks as will be readily understood with the perimetric flanges of the end components 11 and 12 respectively abutting the outer and inner faces of the wall. To the bottom bar of the outer component 11 of the access box 10 is hinged, as at 19, a downwardly swingable protective cover 20 having a rotary latch 21 to lock with the top bar of said component.

Disposed within the upper part of the outer end component 11 of the access box 10 at one side is a small horizontal axis sheave 22; and arranged in the lower part of the inner component 12 at the corresponding side, is a similar sheave 23 which is rotative about an axis inclined at an angle of approximately forty-five degrees. The purpose of the sheaves 22 and 23 will be later explained.

At opposite sides, the component 12 of the access box 10 has projecting flanges 24 hereto secured by means of bolts 25, the upper ends of the side portions of a V-shaped bracket 26. At its lower end, the bracket 26 is secured by bolts 27, to the inner face of the foundation wall W. Integrally formed with bracket 26 at the bottom, as best shown in Fig. 4, is a lateral cylindrical stud projection 28 whereon is rotatively mounted, with interposition of anti-friction bearings 29 and 30, a reel 31 for the hose H. As shown, the reel 31 has complemental end members in the form of radially-armed spiders 32 and 33 to the inner sides of which are secured, by bolts 34 and 35, disks 36 and 37 respectively of relatively thin flexible sheet metal to form a deep, narrow annular channel about abutting circular hub flanges 39, 40 on the spiders, of a width corresponding to the diameter of the hose H. Accordingly, as the hose H is wound upon or unwound from the reel, its convolutions are constrained to a single plane thereby preventing the hose from being fouled or damaged.

The stud projection 28 of the bracket 26 has an axial hollow 41 (Fig. 4) which is open at its outer end, and which at its inner end has a lateral inlet 42 into which is connected the horizontal branch 43 of a water pipe 44 (Fig. 1) leading a water supply source, not illustrated. Interposed in the pipe 44 is a valve 45 whereof the hand wheel 46 is accessible within the access box 10. Extending into the diametrically enlarged open end 47 of the hollow 41 in the stud projection 28 of the bracket 26 is the tubular axial projection 48 of a circular hub cap 49 (Figs. 1 and 4), which is secured to the outer spider 32 of the reel 31 by headed bolts 50. The cap 49 also has an axial outward prolongation 51 whereof the hollow is in direct communication with that of the stud projection 28, and also a radial outlet 52 whereto the inner end of the hose H is connected by a coupling 53 after having been passed between two spokes of the spider 31. Surrounding the inward axial prolongation 48 of the cap plate 49 is packing 55 which is held in place by a flanged gland 56 affixed by bolts 57 to the outer end of the stud 28 of the bracket 26, and is compressed by a slide collar 58 subject to the force of a helical spring 59 buttressed against the annular shoulder between the small and large diameter portions of the bore in said stud projection. It is to be noted that the bearing 29 is held in place in the assembly by the flange of the gland 56.

To the spider 33 are affixed, by cap screws 60, a pair of relatively thick circular plates 61 and 62 which are centrally apertured to clear the stud projection 28 of the bracket 26 and which incidentally serve to hold the bearing 30 in place in the assembly. The parts 61 and 62 are peripherally toothed as at 63 and 64, and jointly constitute a circumferentially recessed wheel in the annular channel of which is lodged, with capacity for independent rotation, a peripherally grooved ring 65. The ring 65 has a radial lug projection 66 (Fig. 5) whereto is pivoted a pawl 67 which is counter-weighted as at 68 and adapted to pick the teeth 63, 64 of the wheel 61, 62 during retrievement of the hose, as also more fully explained later. A pin 69 on the bracket 26 serves as a stop for the pawl 67 when the pawl is disengaged from the wheel 61, 62 as in Fig. 5.

From Figs. 2 and 3 it will be noted that the hose H, as it leaves the reel 31, passes upwardly between a pair of guide sheaves 70 and 71 carried by a hanger 72 pivotally hung for free swinging movement above the reel about a bolt 73 centrally of the top bar of the inner component 12 of the element 10. Accordingly, the hanger 72 is capable of assuming a tangential position relative to the reel 31, as shown in Figs. 6 and 7, as the hose H is withdrawn or retrieved, as will also be explained more fully presently. At one side, the hanger 72 has a lateral projection 75 which, at its distal end, carries a cylindrical brake shoe 76 which may be of friction material such as rubber, and which is normally engaged between the marginal portions of the flexible disks 36, 37 beyond the spokes of the side members 32, 33 as shown in Fig. 3. Also carried at the end of the projection 75 of the hanger 72 are beveled rolls 77, 78 which, see Fig. 2, normally press inwardly against the outer sides of the disks 36 and 37 of the reel 31 adjacent the peripheral margins of the latter, and thus flex the edge portions of the disks inwardly for clamping action upon the brake shoe 76. At opposite sides, the hanger 72 is provided, moreover, with plain treaded rolls 79 and 80 which are adapted to ride against an arcuate web 81 formed at the inner face of the inner component 12 of the element 10 to counteract the pull of the hose as it is withdrawn from the reel between the guide sheaves 70 and 71.

At its free end, the hose H is provided with a nozzle N, and immediately inward of said nozzle with an enlargement in the form of a ball 82 which, as shown in Fig. 2, comes to rest in the bight between the guide sheaves 70, 71 and thus serves as a stop when the hose is fully wound on the reel 31 with the nozzle tucked within said housing.

Medially fulcrumed at 83 on the bracket 26, so as to be movable against the pull of a spring 84, is a rocker arm 85. To one end 86 of this rocker arm 85 is connected a sling cord or cable 87 which, after under-rounding the ring 65, is affixed as at 88 to the other end of said arm, and which is clamped to the lug 66 of the ring 65 by a screw 66a as in Figs. 5–7.

A second sling or pull cable 89 is connected at one end, as at 90, to an inwardly reaching projection 91 of the bracket 26 adjacent the top of the latter and, after under-rounding a guide sheave 92 on the end 88 of the rocker arm 85, passes over the guide wheel 23 hereinbefore mentioned and from thence outwardly into the element 10, said cable being provided at its free end with a hand grasp 93 which is normally tucked within said access box alongside the hole nozzle N, as shown in Fig. 3.

In order to render the hose accessible from the ground floor F of the building in the event of fire, we have provided an opening 95 in said floor immediately above the reel 31, said opening being normally protected by a removable cover 96.

Fulcrumed at 97 to one of the side members of the bracket 25 and overreaching the tooth wheel 61, 62 is a small finger 98 whereof the free end is normally held down upon a stop projection 99 on the said bracket, by a helical tension spring 100. To the finger 98 is pivoted, at an intermediate point, a detent 101 for engaging the teeth of the wheel 61, 62.

*Operation*

Assume that the apparatus is in the normal position in which it is illustrated in Figs. 1–5. In preparation for the use of the hose H out-of-doors, the cover 20 of the access box 10 in the wall W is unlatched and swung to open position about the hinge 19 as in Fig. 2. The nozzle N of the hose is thereupon grasped and the hose drawn out through the now open access box 10, and, as it leaves the reel 31, is guided between sheaves 70 and 71 on the hanger 72 which latter will assume a tangential relationship to the reel due to capacity of the hanger 72 to swing on the fulcrum bolt 73 as in Fig. 6, the brake shoe 76 being incidentally retracted from the reel to allow rotation of the latter in the direction of the arrow indicated thereon in Fig. 6. As rotation of the reel 31 begins, the detent 101 is moved from the position of Fig. 5 to the position of Fig. 6 by reason of being engaged with the teeth of the wheel 61, 62, the spring 100 yielding and thereby permitting the arm 98 to rise for an instant to make this change possible, the ring 65 remaining quiescent all the while due to being free within the annular channel of said wheel. Upon release of the hose H, the hanger 72 simply reassumes the normal position of Fig. 5, incident to which the brake shoe 76 is re-engaged with the reel to restrain it against further rotation. After the hose has been withdrawn the water can be turned on from the exterior since the operating member of the valve 45 is accessible within the access box 10.

Retrieving the hose is accomplished from out-of-doors by impartation of successive upward tugs upon the hand grasp 93 of the cable 89 incident to which said cable is guided over the wheel 23 and under the wheel 22 in the element 10 as shown in the dot-and-dash lines in Fig. 3. With each tug upon the cable 89, it will be seen that the rocker arm 85 is swung from position of Fig. 5 to the position of Fig. 7, the sling cable 87 being thereby actuated to impart a partial turn to the ring 65 in the direction of the arrow in Fig. 7. As this movement of the ring is initiated, the pawl 67 in leaving the stop pin 69 is released and swung, by reason of being counterweighted at 68, into engagement with the teeth of the wheel 61, 62. As a consequence, the reel is positively turned substantially through a half rotation to take up the hose. As the pull cable 89 is relaxed in preparation for the next tug, the rocker arm 85 is returned by the spring 84 to the position of Fig. 5 with attendant impartation of a partial reverse rotation to the ring 65 during which the pawl 67 simply slides idly over the teeth of wheel 61, 62 without impartation of movement to the reel, the detent 101 serving to maintain the reel in the position to which it had been turned. Thus, by repetitions of the above procedure, the hose will be fully retrieved eventually and finally stopped as the ball 82 on the hose H comes to rest in the bight between the two guide sheaves 70, 71 and the brake shoe 76 re-engages the reel upon the return swing of the hanger 72 to its normal rest position in Fig. 5.

In the event of a fire within the building, the hose is accessible for withdrawal from the reel upon removal of the cover 96 from over the opening 95 in the floor F, as will be readily understood from Figs. 1 and 3. After such emergency use, the hose can be retrieved in the same manner as previously described in connection with its outdoor use.

While in accordance with the provisions of the statutes, we have illustrated and described the best forms of embodiment of our invention now known to us it will be apparent to those skilled in the art that changes may be made in the forms of the apparatus described without departing from the spirit and scope of the invention, as set forth in the appended claims, and that in some cases certain features of our invention may be used to advantage without a corresponding use of other features.

Having thus described our invention, we claim:

1. Hose reeling apparatus comprising a reel supported for rotation to permit withdrawal of the hose therefrom; a circumferentially grooved toothed wheel affixed to the reel; a ring lodged in the groove of the wheel; a normally retracted pawl pivoted on a radial projection of the ring and adapted to engage the teeth of the wheel; a medially fulcrumed spring-restrained rocker arm; a sling cord or cable partly under-rounding said ring and having its ends secured respectively to opposite ends of the rocker arm; actuating means for actuating rocker arm against the pull of the spring for impartation of successive rotary movements to the ring by the cord or cable and communication by the ring through the pawl to the wheel to reversely rotate the reel in retrieving the hose.

2. The invention according to claim 1, wherein the cord or cable is spot affixed to the radial projection of said ring.

3. The invention according to claim 1, wherein the operating means for the rocker arm includes a sheave at one end of said arm; a pull cord or cable connected at one end to a fixed anchorage and under-rounding the sheave on the rocker arm; and a hand grasp affixed to the opposite end of said pull cord or cable.

4. The invention according to claim 3, further including a detent adapted to cooperate with the toothed wheel and thereby hold the reel against rotation after the end of each tug upon the pull cord or cable in retrieving the hose.

5. The invention according to claim 4, wherein the detent is pivoted upon a lever fulcrumed on a fixed center and yielding spring urged toward the toothed wheel, for capacity of the detent to automatically change its position to the wheel.

6. Hose reeling apparatus comprising an access box set crosswise into a small opening in a foundation wall of a building immediately below the ground floor of the building, said box having rectangular end frames around the opening interiorly and exteriorly of said wall; an open suspension bracket with downwardly converging side arms secured respectively at their upper ends to outwardly projecting lugs at opposite sides of the inner frame of the access box, said arms being joined at their bottom ends, and provided at the juncture with a lateral cylindrical stud projection; a reel mounted for rotation upon the stud; a hose associated with the reel and having its nozzle end disposed within the access box element for convenience of access to withdraw the hose from out-of-doors for gardening use.

7. The invention according to claim 6, further including a circumferentially grooved wheel secured to the reel and having peripheral teeth; a ring lodged in the groove of the wheel; a normally retracted pawl on a radial projection of the ring adapted to cooperate with the teeth of the wheel to turn the reel in a direction to retrieve the hose after its use; a spring restrained rocker arm medially fulcrumed on the bracket above the wheel; a sling cord or cable under-rounding the ring and having its ends secured respectively to opposite ends of the rocker arm; actuating means for actuating the rocker arm against the draw of the spring for impartation of successive partial rotary movements to the ring by the sling cord or cable and communication by the ring, through the pawl to the toothed wheel, to correspondingly rotate the reel in retrieving the hose; and a member accessible within the access box for operating said actuating means.

8. The invention according to claim 6, further including a circumferentially grooved wheel secured to the reel and having peripheral teeth; a ring lodged in the groove of the wheel; a normally retracted pawl on a radial projection of the ring adapted to cooperate with the teeth of the wheel to turn the reel in a direction to retrieve the hose after its use; a spring restrained rocker arm medially fulcrumed on the bracket above the wheel; a sling cord or cable under-rounding the ring and having its ends secured respectively to opposite ends of the rocker arm; a guide sheave carried at one end of the rocker arm; a pull cord secured at one end to the bracket and under-rounding the guide sheave; other guide sheaves over which the other end of the pull cord is passed for diversion outwardly through the access box aforesaid; and a hand grasp affixed to the free end of the pull cord, and accessible in the access box whereby the rocker arm is actuatable to impart, through the sling cord or cable, successive partial rotations to the ring for communication through the pawl and the toothed wheel of corresponding rotary movements to the reel in retrieving the hose.

9. Hose reeling apparatus for installation in the basement of a building, comprising a horizontal axis reel disposed below a small access opening in the foundation wall of a building immediately below the ground floor level, said reel having a hub and a pair of side members in the form of disks of relatively thin sheet metal together providing a relatively deep circumferential hose receiving channel of a width corresponding to the hose, a hanger arranged above the reel and carrying a pair of guide sheaves between which the hose is passed for diversion of its nozzle and horizontally outward through the access opening in the foundation wall, said hanger being pivotally suspended for capacity to swing into tangential alignment with the reel as the hose is withdrawn, a brake shoe carried by the hanger and adapted to engage between peripheral margins of the side disks of the reel, a pair of bevelled rolls also carried by the hanger for engaging the disks from opposite sides adjacent their peripheries and pressing them inwardly to close in upon the shoe when said shoe is in operative position, and thereby normally hold the reel against rotation.

References Cited in the file of this patent

UNITED STATES PATENTS

| | | |
|---|---|---|
| 1,168,442 | Triggs | Jan. 18, 1916 |
| 2,118,294 | Cox | May 24, 1938 |
| 2,174,099 | Vogler | Sept. 26, 1939 |

FOREIGN PATENTS

| | | |
|---|---|---|
| 548,601 | Canada | Nov. 12, 1957 |